United States Patent
Kim

(10) Patent No.: US 8,360,533 B2
(45) Date of Patent: Jan. 29, 2013

(54) REGENERATIVE BRAKING SYSTEM

(75) Inventor: Joo Gon Kim, Gyeonggi-do (KR)

(73) Assignee: Mando Corporation, Gyeonggi-Do (KR)

( * ) Notice: Subject to any disclaimer, the term of this patent is extended or adjusted under 35 U.S.C. 154(b) by 202 days.

(21) Appl. No.: 12/890,140

(22) Filed: Sep. 24, 2010

(65) Prior Publication Data

US 2011/0074204 A1 Mar. 31, 2011

(30) Foreign Application Priority Data

Sep. 25, 2009 (KR) .................. 10-2009-0091181
Sep. 25, 2009 (KR) .................. 10-2009-0091182

(51) Int. Cl.
*B60T 8/64* (2006.01)
(52) U.S. Cl. ............ 303/152; 303/3; 188/162; 180/65.1
(58) Field of Classification Search ............ 303/3; 188/156–158, 162; 701/22, 70; 180/65.1, 180/65.21, 65.285, 65.29, 65.31
See application file for complete search history.

(56) References Cited

U.S. PATENT DOCUMENTS 5,998,960 A * 12/1999 Yamada et al. .......... 320/104
7,311,163 B2 * 12/2007 Oliver .................... 180/165
2007/0108838 A1 * 5/2007 Shaffer et al. ............ 303/152
2010/0204894 A1 * 8/2010 Strengert et al. .......... 701/70

FOREIGN PATENT DOCUMENTS

| DE | 195 11 287 A1 | 1/1996 |
| DE | 198 13 146 A1 | 10/1998 |
| DE | 10 2006 055 766 A1 | 10/2007 |
| DE | 10 2007 036 261 A1 | 2/2009 |
| DE | 10 2008 005 043 A1 | 7/2009 |
| JP | 07-177608 | 7/1995 |
| KR | 10-2008-0008588 A | 1/2008 |

OTHER PUBLICATIONS

German Office Action, w/ English translation thereof, issued in German Patent Application No. DE 10 2010 046 286 dated Apr. 11, 2011.

* cited by examiner

*Primary Examiner* — Pamela Rodriguez
(74) *Attorney, Agent, or Firm* — McDermott Will & Emery LLP

(57) ABSTRACT

Disclosed is a regenerative braking system capable of minimizing uncomfortable feeling during the braking operation while improving responsiveness and control performance by performing the braking operation using an electric motor. An electro-mechanical braking system is used when braking a rear wheel or front and rear wheels, so variable frictional braking is achieved, thereby maximizing the recovery rate of the regenerative energy.

7 Claims, 5 Drawing Sheets

REGENERATIVE BRAKING SYSTEM

This application claims the benefit of Korean Patent Application Nos. 10-2009-0091181 and 10-2009-91182 filed on Sep. 25, 2009, in the Korean Intellectual Property Office, the disclosure of which is incorporated herein by reference.

BACKGROUND

1. Field

The disclosure relates to a regenerative braking system, and more particularly to a regenerative braking system capable of charging a battery with regenerative energy through regenerative braking upon the braking operation for a vehicle.

2. Description of the Related Art

A regenerative braking system is a core technology for an electric car driven by electric energy, such as an HEV (hybrid electric vehicle), an EV (electric vehicle), and an FCEV (fuel cell electric vehicle).

Different from the normal braking system, in which kinetic energy of the vehicle is converted into frictional heat energy, the regenerative braking system drives a motor by using the kinetic energy and charges a battery with electric energy generated from the motor in order to increase the driving distance and improve the driving efficiency of the HEV, EV and FCEV, so that the regenerative braking system is essential to improve the fuel consumption ratio.

When the braking operation for an electric vehicle equipped with the regenerative braking system is performed, a driver must determine the priority between the regenerative braking and the normal frictional braking according to the driving state of the vehicle and the intention of the driver. In addition, if the regenerative braking and the normal frictional braking are simultaneously performed, the power of the regenerative braking and the normal frictional braking must be controlled. The energy recovery rate may become increased as the proportion of the regenerative braking is increased, but the regenerative braking must be restrained depending on the charge state of the battery, the motor temperature, etc. If the power of the regenerative braking is not properly controlled, the motor or the battery may be damaged. In contrast, if the power of the regenerative braking is insufficient, the power of the normal frictional braking must be increased to satisfy the demand of the driver for reducing the vehicle speed.

Therefore, a regenerative braking system employing a conventional hydraulic brake system is used for a soft type electric vehicle having a low-capacity motor. In addition, since the proportion of the regenerative braking and the normal frictional braking is fixed according to the vehicle speed, the amount of regenerative energy retrieved to the battery may be limited.

In addition, the regenerative braking system employing the conventional hydraulic brake system may cause uncomfortable feeling during the braking operation if the regenerative braking transient occurs due to the difference in responsiveness between the hydraulic braking force of the hydraulic brake and the regenerative driving force of the driving motor.

SUMMARY

Accordingly, it is an aspect of the disclosure to provide a regenerative braking system capable of maximizing the recovery rate of regenerative energy using an electro-mechanical brake system while minimizing uncomfortable feeling during the braking operation.

Additional aspects and/or advantages of the disclosure will be set forth in part in the description which follows and, in part, will be apparent from the description, or may be learned by practice of the disclosure.

The foregoing and/or other aspects of the disclosure are achieved by providing a regenerative braking system installed in an electric vehicle. The regenerative braking system includes a fuel cell serving as a main power source, a battery serving as an auxiliary power source, a driving motor receiving power from the fuel cell to drive at least one of front and rear wheels, an inverter converting DC voltage supplied from the fuel cell into 3-phase voltage to drive the driving motor and charging the battery with regenerative energy recovered from the driving motor upon braking of the electric vehicle, an EMB (electro-mechanical braking) actuator installed to the rear wheel to generate braking force by operating a caliper using a motor, an EMB ECU controlling an operation of the EMB actuator, and a central ECU controlling the driving motor to perform regenerative braking upon the braking of the electric vehicle, and communicating with the EMB ECU in order to operate the EMB actuator to perform EMB with respect to the rear wheel.

According to the disclosure, the regenerative braking system further includes a hydraulic disc brake installed to the front wheel and a hydraulic module supplying braking pressure to the hydraulic disc brake, wherein the central ECU controls the hydraulic module in order to operate the hydraulic disc brake to perform hydraulic braking with respect to the front wheel upon the braking of the electric vehicle, and communicates with the EMB ECU in order to operate the EMB actuator to perform the EMB with respect to the rear wheel.

According to the disclosure, the EMB ECU generates braking force through a regenerative braking coordinated control with the central ECU, in which the braking force is obtained by subtracting regenerative braking force for the regenerative braking of the driving motor and hydraulic braking force for the hydraulic braking from braking force required by a driver.

According to the disclosure, the regenerative braking system further includes an EMB actuator installed to the front wheel to generate the braking force by operating the caliper using the motor, wherein the central ECU controls the driving motor to perform the regenerative braking upon the braking of the electric vehicle, and communicates with the EMB ECU in order to operate the EMB actuator to perform the EMB with respect to the front and rear wheels.

According to the disclosure, the EMB ECU generates braking force through a regenerative braking coordinated control with the central ECU, in which the braking force is obtained by subtracting regenerative braking force for the regenerative braking of the driving motor and hydraulic braking force for the hydraulic braking from braking force required by a driver.

According to the disclosure, the EMB actuator includes a motor coupled to the rear wheel to move a pad arranged at one side of a disc while being spaced from the disc, a reducer provided between the motor and the pad to amplify the braking force by reducing rotational force of the motor, and a gear installed between the reducer and the pad to convert rotational force of the reducer into linear movement such that a braking torque is transferred to the pad as the braking force.

As described above, according to one aspect of the disclosure, different from the regenerative braking system of the related art employed in the soft type HEV having the low-capacity motor with a fixed proportion between the regenerative braking and the friction braking based on the vehicle speed, the EMB (electro-mechanical braking) type regenerative braking system according to the disclosure can be employed in the hard type electric vehicle while realizing variable frictional braking, thereby maximizing the recovery rate of regenerative energy.

In addition, according to another aspect of the disclosure, different from the regenerative braking system of the related art, which causes uncomfortable feeling during the braking operation if the regenerative braking transient occurs due to the difference in responsiveness between the hydraulic braking force of the hydraulic brake and the regenerative driving force of the driving motor, the EMB type regenerative braking system according to the disclosure can perform the EMB with respect to rear wheels or front and rear wheels, so that fast responsiveness and superior control performance can be achieved, and thus, problems occurring in the prior art can be minimized.

Further, according to still another aspect of the disclosure, the EMB type regenerative braking system can ensure the safety of the vehicle and improve the braking performance.

BRIEF DESCRIPTION OF THE DRAWINGS

These and/or other aspects and advantages of the disclosure will become apparent and more readily appreciated from the following description of the embodiments, taken in conjunction with the accompanying drawings of which.

DETAILED DESCRIPTION OF THE EXEMPLARY EMBODIMENTS

Figure 1:
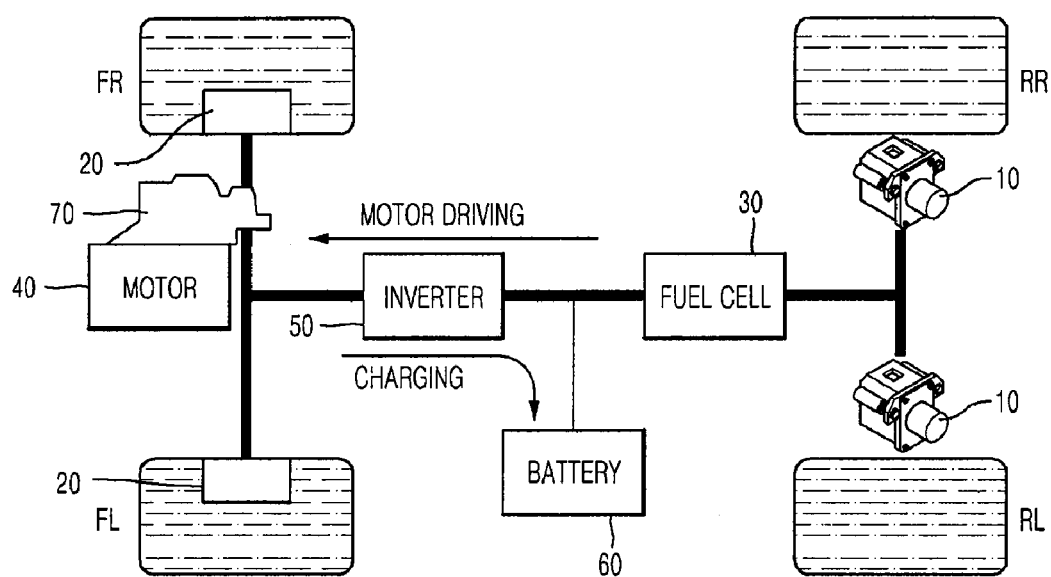
FIG. 1 is a schematic view showing the structure of a regenerative braking system employed in a fuel cell vehicle according to one embodiment of the disclosure.

Reference will now be made in detail to the embodiments of the disclosure, examples of which are illustrated in the accompanying drawings, wherein like reference numerals refer to the like elements. The embodiments are described below to explain the disclosure by referring to the figures.

A regenerative braking system according to the embodiments of the disclosure signifies a braking device capable of improving the fuel consumption ratio by charging an auxiliary power source with regenerative energy during the braking operation. The regenerative braking system is based on the convergence technology, in which a technology for a regenerative braking device and an electro-mechanical regenerative braking device is converged into a technology for an electric vehicle to obtain environmental-friendship and to improve the fuel consumption ratio.

The regenerative braking system according to the embodiments of the disclosure can improve the fuel consumption ratio and ensure the safety of the vehicle through the optimal coordinated control for regenerative braking force of a driving motor and braking force of a brake.

When comparing the fuel consumption ratio of a fuel cell vehicle with that of a conventional vehicle, the fuel consumption ratio of the fuel cell vehicle is improved through the regenerative braking. This depends on the recovery rate of regenerative braking energy. Thus, the regenerative braking coordinated control system, which controls the braking rate between the regenerative braking and the friction braking based on system conditions (charge status of the auxiliary power source, the vehicle speed, etc.), is necessarily required for a environmental-friendly vehicle as well as the fuel cell vehicle.

In order to provide an advanced technology for improving stability and steering performance of the vehicle together with the regenerative braking, the electro-mechanical system is necessarily required because the conventional hydraulic braking system represents limitations. That is, in order to maximize the charge rate of a battery by converting kinetic energy into electric energy through the regenerative braking of the motor during the braking operation, an active-control braking device capable of reducing braking force corresponding to the regenerative braking torque is necessary.

Therefore, the embodiments of the disclosure provide a regenerative braking system integrated with an EMB system. According to the embodiments of the disclosure, the EMB operation is coordinated with the regenerative braking operation to constitute the regenerative braking coordinated system, so that the amount of regenerative energy retrieved to the battery can be maximized and the safety of the driver can be ensured.

FIG. 1 is a schematic view showing the structure of a regenerative braking system employed in an electric vehicle according to one embodiment of the disclosure.

As shown in FIG. 1, EMB actuators 10 are installed to rear wheels RR and RL of the electric vehicle to generate braking force by operating a caliper equipped with a motor, and hydraulic disc brakes 20 are installed to front wheels FR and FL to generate hydraulic braking force using brake fluid supplied from a hydraulic module.

The EMB actuator 10 represents superior dynamic behavior, braking performance, and responsiveness as compared with those of the hydraulic disc brake 20. In addition, since an EMB ECU directly transmits a signal to drive the motor, the EMB actuator 10 can control the vehicle speed more precisely than the hydraulic disc brake 20.

The electric vehicle includes a driving motor 40 receiving power from a fuel cell 30 to generate driving force for the electric vehicle, an inverter 50 which converts DC voltage applied to the driving motor into 3-phase voltage to drive the driving motor 40 and supplies regenerative energy recovered from the driving motor 40 to a battery 60 as charge voltage, and a reducer 70 which reduces rotational force of the driving motor 40 at a predetermined reduction ratio and transfers the reduced rotational force of the driving motor 40 to the front wheels serving as driving wheels.

Upon the acceleration of the electric vehicle, as indicated by arrows, DC voltage of the fuel cell 30 is supplied to the inverter 50 and the inverter 50 converts the DC voltage into the 3-phase voltage. The 3-phase voltage is supplied to the driving motor 40 so that the driving motor 40 is driven. In addition, the rotational force of the driving motor 40 is reduced at a predetermined reduction ratio by the reducer 70 and then transferred to the front wheels serving as driving wheels, thereby driving the electric vehicle.

Upon the deceleration or braking operation of the electric vehicle, as indicated by arrows, the power generated from the driving motor 40 is charged in the battery 60 through the inverter 50 due to the regenerative braking operation of the driving motor 40.

Figure 2:
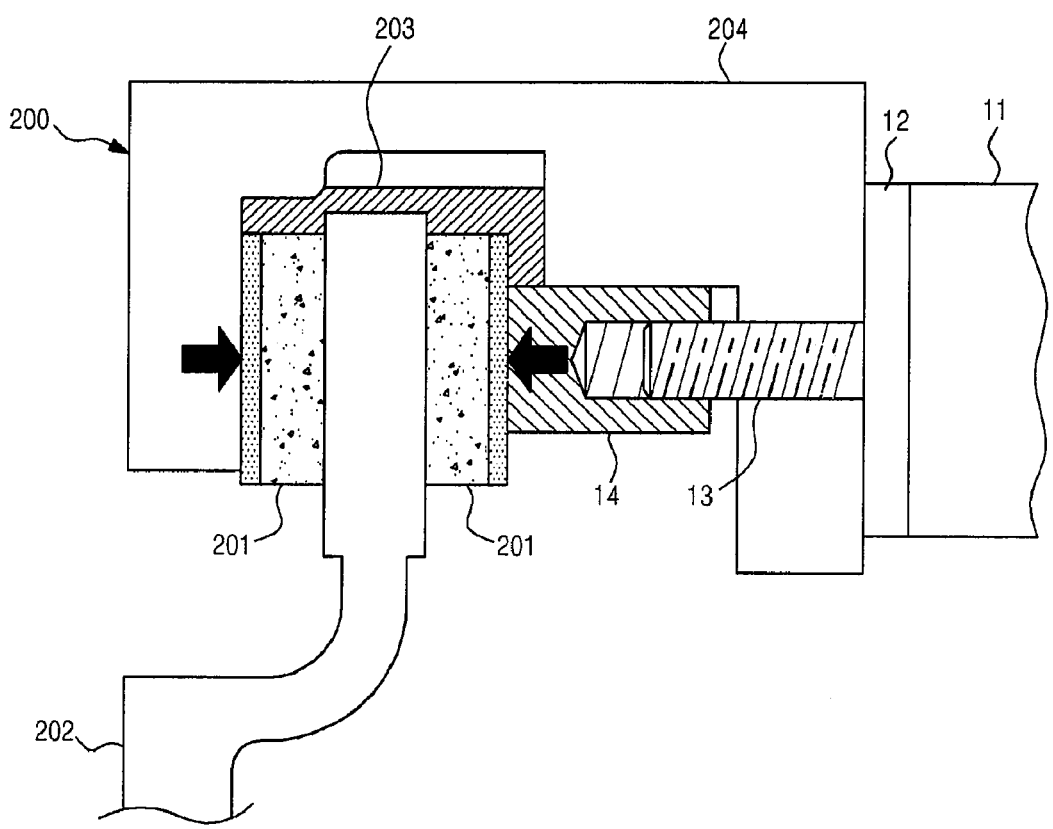
FIG. 2 is a schematic sectional view of an EMB actuator shown in FIG. 1.

FIG. 2 is a schematic sectional view showing the EMB actuator 10 of the regenerative braking system according to the embodiment of the disclosure.

As shown in FIG. 2, the EMB actuator 10 includes a motor 11, a reducer 12, and screw gears 13 and 14. The motor 11 is a DC motor for providing the braking force and the reducer 12 reduces the rotational force of the motor 11 by using planetary gears to increase the braking force. The screw gears 13 and 14 convert the rotational movement into the linear movement to convert the braking torque into the braking force.

The EMB actuator 10 is coupled with a disc brake module 200.

The disc brake module 200 includes pads 201, a disc 202, a torque member 203 and a caliper housing 204. The pads 201 are located at both sides of the disc 202. The pads 201 receives force from a head 14 of the EMB actuator 10 and presses the disc 202 connected to wheels by using a caliper, thereby generating the braking force. The disc 202 rotates in a state in which the disc 202 is fixed to a hub of the wheel or a driving shaft in such a manner that the braking force can be generated through friction between the disc 202 and the pads 201. The torque member 203 interworks with the pads 201 such that the outer pad 201 can be moved toward the disc 202 when the inner pad 201 is pressed against the disc 202. The caliper housing 204 surrounds the disc 202 of each wheel and provides a space where the pads 201 moved by the screw gears 13 and 14 are pressed against the disc 202.

The motor 11 of the EMB actuator 10 generates the torque by converting electric energy into mechanical rotational energy. The motor 11 is classified into an AC motor using AC current, and a DC motor using DC current. The DC motor can perform the speed control in a wide range with high precision, and the torque control with high efficiency for selecting the ignition torque or the acceleration torque. Such characteristics of the DC motor are suitable for the EMB that must precisely trace the target braking force while easily controlling the braking force during the braking operation.

The reducer 12 amplifies the torque transmitted from the motor 11 and reduces the rotational force of the motor 11. For instance, the reducer 12 includes planetary gear heads which are concentrically arranged with respect to the rotating shaft of the motor 11 by using planetary gears. The planetary gear heads have sizes smaller than sizes of other gear arrays and power input/output of the planetary gear heads can be achieved through the same axis with high efficiency, so that the planetary gear heads are extensively used.

The screw gears 13 and 14 include a male screw and a female screw. The screw gears 13 and 14 convert the rotational force applied to the male screw from the reducer 12 into the linear movement of the female screw so that the pads 201 are pressed against the disc 202, thereby generating the braking force. According to the embodiment of the disclosure, the male screw connected to a carrier of the reducer 12 will be referred to as a screw 13 and the female screw pressing the pad 201 will be referred to as a head 14.

When the EMB operation is performed in the regenerative braking system having the above structure according to the embodiment of the disclosure, the rotational force of the motor 11 is transferred to the inner pad 201 through the head 14, so that the inner pad 201 is pressed against the disc 202 as indicated by the arrow. As the inner pad 201 is pressed against the disc 202, the head 14 may not move forward any more. Then, the caliper housing 204 connected to the body of the motor 11 is moved back due to reaction so that the outer pad 201 is pressed against the disc 202. Thus, the inner and outer pads 201 are simultaneously pressed against the disc 202, thereby braking the disc 202 by friction.

When the EMB operation is released, the motor 11 is reversely driven, so that the screw 13 is screw-coupled into the head 14. At this time, the force applied to the caliper housing 204, and the pressing force of the inner and outer pads 201 to the disc 202 are released, so that the braking force is released and the head 14 returns to its initial position while being spaced apart from the disc 202 by a predetermined distance.

Figure 3:
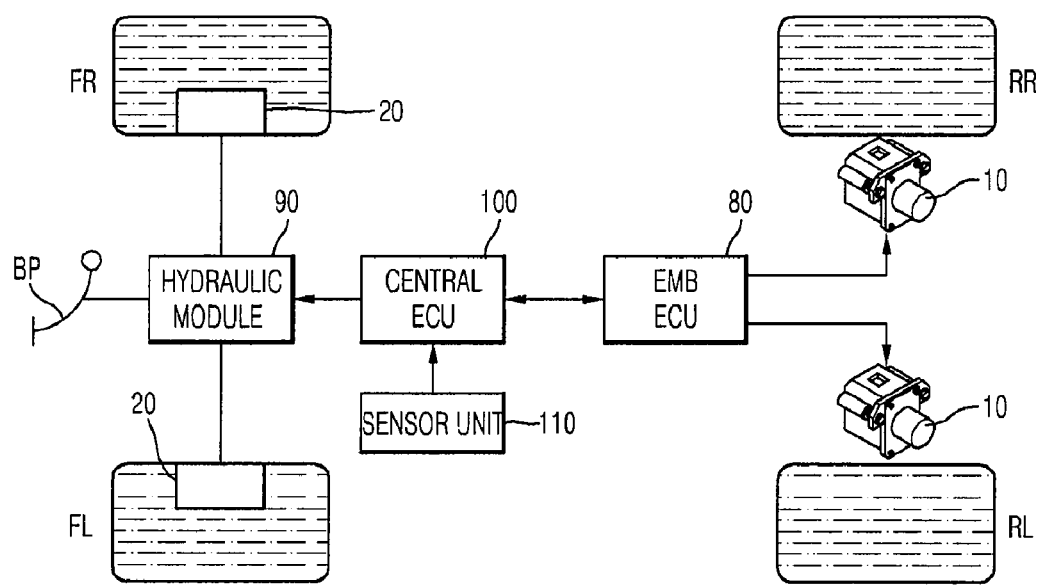
FIG. 3 is a schematic view showing a control module for a regenerative braking system according to one embodiment of the disclosure.

FIG. 3 is a schematic view showing a control module for the regenerative braking system according to one embodiment of the disclosure.

As shown in FIG. 3, upon the braking operation for the electric vehicle, a central ECU 100 controls a hydraulic module 90 to operate the hydraulic disc brake 20 based on sensing information, such as the intention of the driver for the braking operation, which is input from a sensor unit 110, thereby hydraulically braking the front wheels FR and FL. At this time, the regenerative braking of the driving motor 40 is simultaneously performed. In addition, the central ECU 100 transmits a control signal to the EMB ECU 80 for the EMB operation. Upon receiving the control signal, the EMB ECU 80 controls the operation of the EMB actuator 10 to perform the EMB operation with respect to the rear wheels RR and RL.

The central ECU 100 determines the power of the regenerative braking and the EMB braking according to the vehicle conditions, such as the intention of the driver for the braking operation, the driving state of the vehicle, the charge state of the battery, and the motor characteristics. The energy recovery rate may become increased as the proportion of the regenerative braking is increased, but the regenerative braking must be properly controlled to prevent the driving motor 40 and the battery 60 from being damaged. As the power of the regenerative braking has been determined, the central ECU 100 controls the inverter 50 to operate the driving motor 40 during the braking operation for the vehicle such that the regenerative braking can be generated. The EMB ECU 80 receives the intention of the driver for the braking operation from the central ECU 100 according to the manipulation of a brake pedal BP by the driver, and controls the operation of the EMB actuator 10 installed to the rear wheels to generate partial braking force using a part of remaining braking force except for the regenerative braking force determined based on the regenerative braking algorithm.

Thus, the hydraulic braking is applied to the front wheels and the electric braking is applied to the rear wheels of the electric vehicle employing the regenerative braking system according to one embodiment of the disclosure. In detail, a CBS (conventional brake system) employing an ESC (electronic stability control) capable of performing the active braking is installed to the front wheels, and the EMB actuator 10 capable of performing the active braking without additional hardware is installed to the rear wheels.

The central ECU 100 and the hydraulic module 90 are installed to the front wheels for the purpose of ESC control, and a conventional hydraulic line is connected to the front wheels to enable the braking operation when the fail occurs. The rear wheels are driven by a motor which is electronically driven by a to motor driver. The EMB ECU 80 is provided to control the motor and the motor driver. The EMB ECU 80 is provided with a sensor capable of measuring current to estimate the power of the motor 11 of the EMB actuator 10. The EMB ECU 80 has an active control function as well as ABS/TCS/ESC functions. In addition, various sensors, such as a steering angle sensor, a yaw rate sensor, a lateral acceleration sensor, a wheel speed sensor, and a pedal travel sensor, are provided for the purpose of ESC control.

In the regenerative braking system according to the embodiment of the disclosure, the disc brake 20 is installed to the front wheels to perform the basic braking, the active braking and the regenerative braking, and the EMB actuator 10 is installed to the rear wheels to perform the basic braking, the active braking, the regenerative braking, and the auxiliary braking.

If the driver steps on the brake pedal BP, the braking occurs at the front wheels through the hydraulic pressure compression. In this case, the central ECU 100 recognizes the intention of the driver for the braking operation, and calculates the required EMB power to perform the EMB operation with respect to the rear wheels by enabling the EMB ECU 80 to operate the EMB actuator 10.

In other words, upon the braking operation for the rear wheels, the central ECU 100 recognizes the intention of the driver for the braking operation and calculates the total braking force and the braking force for each wheel corresponding to the intention of the driver to brake the wheels by operating the EMB actuator 10 under the control of the EMB ECU 80.

If the ABS/TCS/ESC functions are performed based on the input signal from the sensor, the front wheels are controlled based on the ESC using the hydraulic pressure, and the rear wheels are controlled according to the logic of the EMB ECU 80.

If the fail occurs due to the failure of the hydraulic module 90 or the central ECU 100, or discharge of the battery, the front wheels are driven by the hydraulic pressure and the braking occurs by the foot force of the driver. That is, the backup function is realized by the front wheel hydraulic line upon the emergency.

The regenerative braking for the front wheels is performed through the hydraulic pressure regenerative control scheme during the driving of the front wheels and the regenerative braking for the rear wheels is performed through the EMB regenerative control scheme during the driving of the rear wheels.

Figure 4:
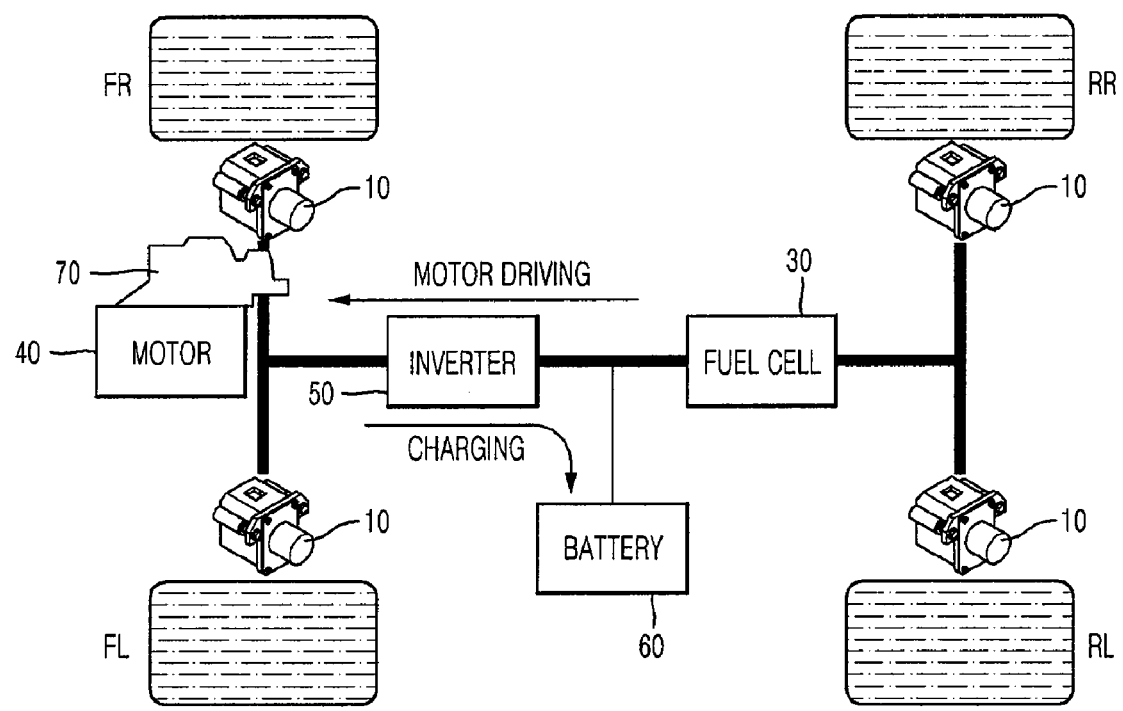
FIG. 4 is a schematic view showing the structure of a regenerative braking system employed in a fuel cell vehicle according to another embodiment of the disclosure.

FIG. 4 is a schematic view showing the structure of a regenerative braking system according to another embodiment of the disclosure.

As shown in FIG. 4, EMB actuators 10 are installed to front wheels FR and FL and rear wheels RR and RL of the electric vehicle to generate braking force by operating a caliper equipped with a motor.

The EMB actuator 10 represents superior dynamic behavior, braking performance, and responsiveness as compared with those of the hydraulic disc brake. In addition, since an EMB ECU directly transmits a signal to drive the motor, the EMB actuator 10 can control the vehicle speed more precisely than the hydraulic disc brake.

The electric vehicle includes a driving motor 40 receiving power from a fuel cell 30 to generate driving force for the electric vehicle, an inverter 50 which converts DC voltage applied to the driving motor into 3-phase voltage to drive the driving motor 40 and supplies regenerative energy recovered from the driving motor 40 to a battery 60 as charge voltage, and a reducer 70 which reduces rotational force of the driving motor 40 at a predetermined reduction ratio and transfers the reduced rotational force of the driving motor 40 to the front wheels serving as driving wheels.

Upon the acceleration of the electric vehicle, as indicated by arrows, DC voltage of the fuel cell 30 is supplied to the inverter 50 and the inverter 50 converts the DC voltage into the 3-phase voltage. The 3-phase voltage is supplied to the driving motor 40 so that the driving motor 40 is driven. In addition, the rotational force of the driving motor 40 is reduced at a predetermined reduction ratio by the reducer 70 and then transferred to the front wheels serving as driving wheels, thereby driving the electric vehicle.

Upon the deceleration or braking operation of the electric vehicle, as indicated by arrows, the power generated from the driving motor 40 is charged in the battery 60 through the inverter 50 due to the regenerative braking operation of the driving motor 40.

Hereinafter, the EMB operation of the regenerative braking system having the above structure according to another embodiment of the disclosure will be described with reference to FIG. 2. When the EMB operation is performed, the rotational force of the motor 11 is transferred to the inner pad 201 through the head 14, so that the inner pad 201 is pressed against the disc 202 as indicated by the arrow. As the inner pad 201 is pressed against the disc 202, the head 14 may not move forward any more. Then, the caliper housing 204 connected to the body of the motor 11 is moved back due to reaction so that the outer pad 201 is pressed against the disc 202. Thus, the inner and outer pads 201 are simultaneously pressed against the disc 202, thereby braking the disc 202 by friction.

When the EMB operation is released, the motor 11 is reversely driven, so that the screw 13 is screw-coupled into the head 14. At this time, the force applied to the caliper housing 204, and the pressing force of the inner and outer pads 201 to the disc 202 are released, so that the braking force is released and the head 14 returns to its initial position while being spaced apart from the disc 202 by a predetermined distance.

Figure 5:
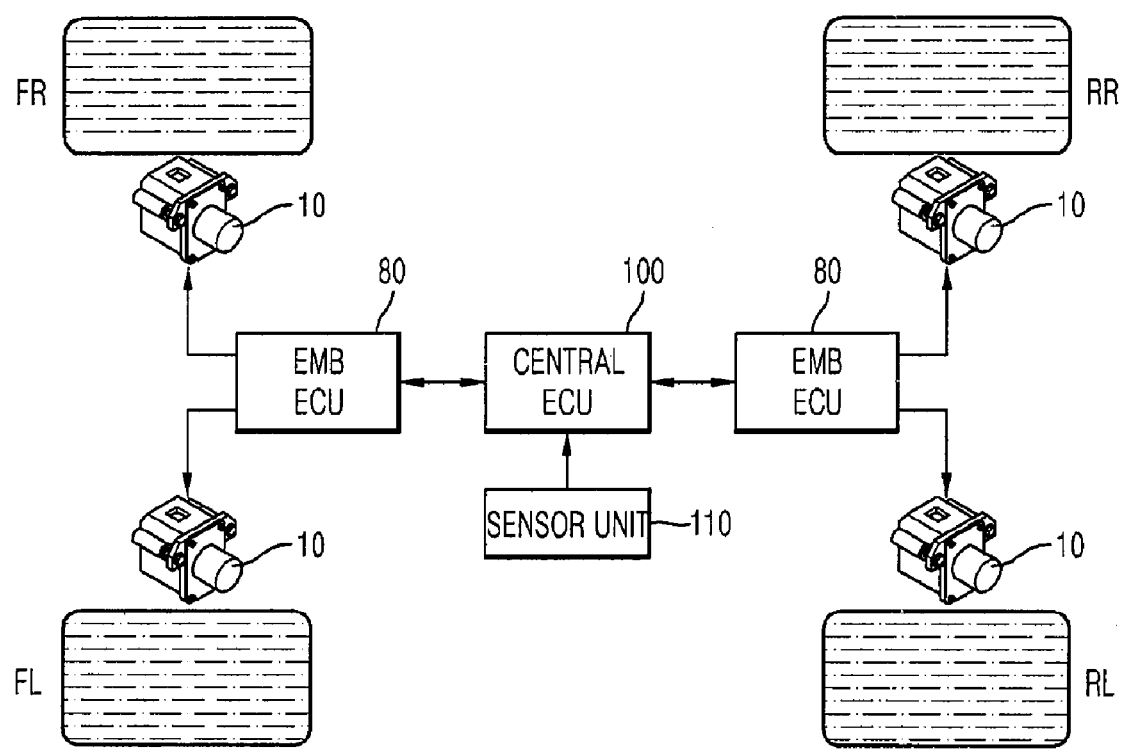
FIG. 5 is a schematic view showing a control module for a regenerative braking system according to another embodiment of the disclosure.

FIG. 5 is a schematic view showing a control module for the regenerative braking system according to another embodiment of the disclosure.

As shown in FIG. 5, upon the braking operation for the electric vehicle, a central ECU 100 transmits a control signal to an EMB ECU 80 based on sensing information, such as the intention of the driver for the braking operation, which is input from a sensor unit 110. Then, the EMB ECU 80 controls the operation of the EMB actuator 10 to perform the EMB with respect to the front wheels FR and FL and the rear wheels RR and RL. Only one EMB ECU 80 can be provided or a plurality of EMB ECUs 80 may be provided corresponding to the number of the wheels.

The central ECU 100 determines the power of the regenerative braking and the EMB braking according to the vehicle conditions, such as the intention of the driver for the braking operation, the driving state of the vehicle, the charge state of the battery, and the motor characteristics. The energy recovery rate may become increased as the proportion of the regenerative braking is increased, but the regenerative braking must be properly controlled to prevent the driving motor 40 and the battery 60 from being damaged. As the power of the regenerative braking has been determined, the central ECU 100 controls the inverter 50 to operate the driving motor 40 during the braking operation for the vehicle such that the regenerative braking can be generated. The EMB ECU 80 receives the intention of the driver for the braking operation from the central ECU 100 according to the manipulation of a brake penal BP by the driver, and controls the operation of the EMB actuator 10 installed to the front and rear wheels to generate partial braking force using a part of the remaining braking force except for the regenerative braking force determined based on the regenerative braking algorithm.

In the electric vehicle employing the regenerative braking system according to another embodiment of the disclosure, the EMB and the regenerative braking are applied to the front wheels and the EMB is applied to the rear wheels.

In detail, the EMB actuators 10 equipped with the CBS (conventional brake system) function are installed to the front and rear wheels.

In order to control the EMB actuators 10, EMB ECUs 80 are installed to the front and rear wheels. The EMB ECUs 80 may control the front and rear wheels.

A sensor unit 110 is electrically connected to the central ECU 100. The sensor unit 110 may include a sensor capable of measuring current to estimate the power of the brake pedal BP and the motor and various sensors capable of performing an active control function as well as ABS/TCS/ESC functions, such as a steering angle sensor, a yaw rate sensor, a lateral acceleration sensor, a wheel speed sensor, and a pedal travel sensor.

If the EMB ECUs 80 are connected to batteries 60, respectively, a backup device operates in such a manner that one EMB ECU 80 can be operated when the other EMB ECU 80 is subject to the electronic fail, so that the braking operation can be performed upon the emergency.

As mentioned above, the regenerative braking system according to the embodiment of the disclosure includes the driving motor 40 equipped with the reducer 70, the inverter 50, the battery 60 and the fuel cell 30 for the purpose of regenerative braking operation. The regenerative coordinated braking occurs at the front wheels in the front wheel driving vehicle, at the rear wheels in the rear wheel driving vehicle, and the front and rear wheels in the four wheel driving (4-WD) vehicle.

According to the regenerative braking system according to another aspect of the disclosure, the EMB actuator 10 is installed to the front and rear wheels to perform the basic braking, active braking, regenerative braking and auxiliary braking operations.

If the driver intentionally steps on the brake pedal BP, the deceleration starts and the regenerative braking occurs. The current is generated by the rotational force of the driving motor 40 to perform the braking operation for the vehicle.

As the driver steps on the brake pedal, the central ECU 100 estimates the reference braking force of the driver and the regenerative braking force of the driving motor 40 and calculates the differential value between the reference braking force and the regenerative braking force.

After obtaining the differential value, the central ECU 100 sends the differential value to the EMB ECU 80.

Upon receiving the differential value from the central ECU 100, the EMB ECU 80 controls the EMB actuator 10 to generate the braking force according to the differential value, thereby braking the front and rear wheels.

If the ABS/TCS/ESC functions are performed, the central ECU 100 transmits information about these functions to the EMB ECU 80 so that the EMB ECU 80 controls the operation of the EMB actuator 10 to generate the braking force required for the CBS and to control the braking slip required for the ABS or ESC. In addition, the central ECU 100 controls the EMB ECU 80 through the feedback control to generate the braking force corresponding to the present status.

If the fail occurs due to the failure of one EMB actuator 10 or one EMB ECU 80, the other EMB ECU 80 is operated to perform the braking operation upon the emergency.

The regenerative braking system according to another embodiment of the disclosure can perform the active braking functions, such as the ABS/TCS/ESC functions, as well as the regenerative braking function of the driving motor 40 and the CBS braking function of the front and rear wheels by using the EMB actuator 10 installed to each wheel.

In order to perform additional functions besides the CBS, regenerative braking and ABS/TCS/ESC functions in the regenerative braking system according to another embodiment of the disclosure, various sensors can be installed to each ECU. The ECU equipped with the sensors is connected to the central ECU to monitor the intention of the driver and the progress situation.

In the regenerative braking system according to another embodiment of the disclosure, the CBS, regenerative braking and ABS/TCS/ESC functions can be controlled by controlling the motor of the EMB actuator installed to the front and rear wheels. The central ECU controls each EMB actuator by using each EMB ECU based on peripheral sensor information and existing information, thereby performing the slip control and yaw rate control through the position/current feedback control.

In the regenerative braking system according to another embodiment of the disclosure, the backup function can be performed through each EMB ECU. To this end, two sets of power sources, EMB ECUs, and EMB actuators are provided. Thus, when the electric fail occurs in one set, the other set is operated upon the emergency.

In the regenerative braking system according to another embodiment of the disclosure, the EMB ECU for the front wheels can be installed separately from the EMB ECU for the rear wheels. In addition, the EMB ECUs can be arranged in left and right directions. Further, two sets of the EMB ECUs can be installed through X-split.

Although few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A regenerative braking system installed in an electric vehicle, the regenerative braking system comprising:
   a fuel cell serving as a main power source;
   a battery serving as an auxiliary power source;
   a driving motor receiving power from the fuel cell to drive at least one of front and rear wheels;
   an inverter converting DC voltage supplied from the fuel cell into 3-phase voltage to drive the driving motor and charging the battery with regenerative energy recovered from the driving motor upon braking of the electric vehicle;
   an EMB (electro-mechanical braking) actuator installed to a rear wheel to generate braking force by operating a caliper using a motor;
   an EMB ECU controlling an operation of the EMB actuator; and
   a central ECU controlling the driving motor to perform regenerative braking upon the braking of the electric vehicle, and communicating with the EMB ECU in order to operate the EMB actuator to perform EMB with respect to the rear wheel,
   wherein the central ECU determines a power of the regenerative braking and a power of the EMB according to a vehicle condition, and controls the power of the EMB in accordance with the power of the regenerative braking.

2. The regenerative braking system of claim 1, further comprising a hydraulic disc brake installed to a front wheel and a hydraulic module supplying braking pressure to the hydraulic disc brake, wherein the central ECU controls the hydraulic module in order to operate the hydraulic disc brake to perform hydraulic braking with respect to the front wheel upon the braking of the electric vehicle, and communicates with the EMB ECU in order to operate the EMB actuator to perform the EMB with respect to the rear wheel.

3. The regenerative braking system of claim 2, wherein the EMB ECU generates braking force through a regenerative braking coordinated control with the central ECU, in which the braking force is obtained by subtracting regenerative braking force for the regenerative braking of the driving motor and hydraulic braking force for the hydraulic braking from braking force required by a driver.

4. The regenerative braking system of claim 1, further comprising an EMB actuator installed to a front wheel to generate the braking force by operating the caliper using the motor, wherein the central ECU controls the driving motor to perform the regenerative braking upon the braking of the electric vehicle, and communicates with the EMB ECU in order to operate the EMB actuator to perform the EMB with respect to the front and rear wheels.

5. The regenerative braking system of claim 4, wherein the EMB ECU generates braking force through a regenerative braking coordinated control with the central ECU, in which the braking force is obtained by subtracting regenerative braking force for the regenerative braking of the driving motor and hydraulic braking force for the hydraulic braking from braking force required by a driver.

6. The regenerative braking system of claim 1, wherein the EMB actuator includes the motor coupled to the rear wheel to move a pad arranged at one side of a disc while being spaced from the disc, a reducer provided between the motor and the pad to amplify the braking force by reducing rotational force of the motor, and a gear installed between the reducer and the pad to convert rotational force of the reducer into linear movement such that a braking torque is transferred to the pad as the braking force.

7. The regenerative braking system of claim 1, wherein the vehicle condition includes a charge state of the battery.

* * * * *